United States Patent [19]

Rowse et al.

[11] Patent Number: 5,372,620
[45] Date of Patent: Dec. 13, 1994

[54] MODIFIED SOL-GEL ALUMINA ABRASIVE FILAMENTS

[75] Inventors: Robert A. Rowse, Shrewsbury; Ronald W. Trischuk, Northborough, both of Mass.

[73] Assignee: Saint Gobain/Norton Industrial Ceramics Corporation, Worcester, Mass.

[21] Appl. No.: 165,288

[22] Filed: Dec. 13, 1993

[51] Int. Cl.$^5$ .............................................. C09C 1/68
[52] U.S. Cl. ................................... 51/309; 501/95; 501/127; 501/152; 423/600; 423/625; 51/307
[58] Field of Search ............... 51/307, 309; 501/12, 501/152, 153, 127, 95; 423/600, 625

[56] References Cited

U.S. PATENT DOCUMENTS

| | | | |
|---|---|---|---|
| 4,314,827 | 2/1982 | Leitheiser et al. | 501/12 |
| 4,623,364 | 11/1986 | Cottringer et al. | 501/309 |
| 4,797,139 | 1/1989 | Bauer | 51/293 |
| 4,881,951 | 11/1989 | Wood et al. | 51/309 |
| 5,009,676 | 4/1991 | Rue et al. | 51/309 |
| 5,034,360 | 7/1991 | Bartels et al. | 501/127 |
| 5,076,815 | 12/1991 | Kunz et al. | 51/293 |
| 5,103,598 | 4/1992 | Kelly | 51/295 |
| 5,106,791 | 4/1992 | Winkler et al. | 51/293 |
| 5,114,891 | 5/1992 | Kunz et al. | 501/127 |
| 5,141,527 | 8/1992 | Winkler et al. | 51/293 |
| 5,163,975 | 11/1992 | Martin | 51/293 |
| 5,164,348 | 11/1992 | Wood | 501/127 |
| 5,185,012 | 2/1993 | Kelly | 51/295 |
| 5,190,567 | 3/1993 | Tamamaki et al. | 51/293 |
| 5,192,339 | 3/1993 | Hasegawa et al. | 51/309 |
| 5,194,073 | 3/1993 | Winter et al. | 51/309 |
| 5,215,551 | 6/1993 | Hatanaka et al. | 51/293 |
| 5,236,471 | 8/1993 | Van Dijen | 51/293 |
| 5,282,875 | 2/1994 | Wood et al. | 51/309 |

*Primary Examiner*—Mark L. Bell
*Assistant Examiner*—Deborah Jones
*Attorney, Agent, or Firm*—David Bennett

[57] ABSTRACT

Filamentary abrasive particles formed from a sol-gel alumina modified by rare earth metal oxides have excellent abrasive qualities.

7 Claims, No Drawings

MODIFIED SOL-GEL ALUMINA ABRASIVE FILAMENTS

TECHNICAL FIELD

The invention relates to sintered sol gel alpha alumina abrasive filaments useful in bonded abrasive products such as grinding wheels and segments, and in coated products such as belts and disks.

BACKGROUND OF THE INVENTION

Sol gel aluminous abrasives have demonstrated substantial advantages over other premium abrasives in broad areas of coated and bonded abrasive applications since their introduction some few years ago. Such abrasives are generally made by drying and sintering a hydrated alumina gel which may also contain varying amounts of additives such as MgO or $ZrO_2$. The dried material is crushed either before or after sintering to obtain irregular blocky shaped polycrystalline abrasive grits in a desired size range. The grits may later be incorporated in a bonded or coated abrasive product such as a grinding wheel or a segment or a belt or disk.

U.S. Pat. No. 4,314,827 to Leitheiser et al. discloses abrasive grits made by such a method in which the sintered grits contain irregular "snowflake" shaped alpha $Al_2O_3$ crystals which are on the order of 5 to 10 microns in diameter. The spaces between the arms of a "snowflake" and between adjacent "snowflakes" are occupied by other phases such as a finely crystalline alumina magnesia spinel.

Another form of sol-gel alumina is described in U.S. Pat. No. 4,881,951 in which certain rare earth metal oxides, usually in the presence of yttria, are introduced to modify the properties of the abrasive grain.

U.S. Pat. No. 4,623,364, which issued on Nov. 18, 1986 assigned to Norton Company, the assignee of this application, discloses a sol gel method for the manufacture of aluminous abrasive grits, and products other than abrasive grits such as coatings, thin films, filaments, rods or small shaped parts, having enhanced properties. In that patent the conversion of the hydrated alumina to alpha alumina is facilitated by the introduction of seed material into the gel or the gel precursor prior to drying. This can be accomplished by either wet vibratory milling of the gel or gel precursor with alpha alumina media, or by the direct addition of very fine seed particles in powder or other form. To make abrasive grits the seeded gel is dried, crushed and fired. The abrasive grits so produced may be used in the manufacture of products such as coated abrasive disks and grinding wheels. Alternatively, to make shaped parts or rods, the material may be formed or molded as by extrusion before firing. In the case of extrusion, the rods formed are later cut or broken into appropriate lengths.

Once the gel has formed, it may be shaped, by any convenient method such as pressing, molding, or extrusion, and then carefully dried to produce an uncracked body of the desired shape. If abrasive material is desired, the gel can be extruded or simply spread out to any convenient shape and dried. After drying, the solid body or material can be cut or machined to form a desired shape or crushed or broken by suitable means, such as a hammer or ball mill, to form abrasive particles or grains.

Such seeded sol gel abrasives have a much finer alpha $Al_2O_3$ crystal structure and higher density than unseeded sol gel material. The alpha $Al_2O_3$ crystals of the seeded sol gel abrasives are submicron and usually on the order of about 0.4 microns and less, although somewhat coarser structure may result if the seeding is performed in a non-optimal manner or if the firing is at too high a temperature, or for too long a duration.

Other materials such as $Fe_2O_3$ can also be used as seeds to facilitate the conversion to alpha $Al_2O_3$. As a rule of thumb, such seeding materials should be isostructural with $Al_2O_3$ and should have similar crystal lattice parameters to work well.

While such sol-gel abrasives have needed to be formed into grits of the desired size by comminuting the larger particles and grading the product, an alternative method has been proposed for the production of abrasive grains. This method which comprises extruding a gel of an alpha alumina precursor, drying, cutting and then firing to convert the alpha alumina precursor to alpha alumina in the form of filamentary particles. This procedure is described in U.S. Pat. No. 5,244,477.

It has now been found that filamentary abrasive particles of sintered sol-gel materials have enhanced properties if the gel comprises minor proportions of certain additives.

SUMMARY OF THE INVENTION

The invention relates to sintered sol gel alpha alumina based polycrystalline filamentary abrasive particles. The particles comprise, in addition to alpha alumina, up to about 10% by weight of yttria and from about 0.2% up to about 5% by weight of a rare earth metal oxide selected from the group consisting of praseodymia, samaria, ytterbia, neodymia, lanthana, gadolinia, dysprosia, erbia and mixtures of two or more such oxides.

The preferred amount of yttria in the final product is preferably from about 1 to about 4% based on the weight of alumina in the final product. The preferred total amount of the rare earth metal oxides, which may be present in the oxide form or in the form of a compound with alumina, measured as the oxide, is from about 0.4 to about 2% by weight based on the weight of alumina in the final product. The preferred compositions comprise neodymia, lanthana and praseodymia in roughly equal proportions.

Such rare earth modified aluminas may also be seeded as described above. With an unseeded sol-gel product the crystallites in the abrasive filaments may be up to about 10 microns, but with the preferred seeded gels, they are less than 1 micron and with optimal processing, less than about 0.2 micron. The filaments can be made by incorporating the rare earth modifiers in a gel of a hydrated alumina, (preferably before gelation has occurred for completeness and uniformity of dispersion), spinning or extruding the gel into filaments, drying the filaments, and firing the dried filaments to a temperature of not more than about 1500° C. Alternatively, and often preferably, the dried filaments can be partially fired to convert them to a non-hydrated form of alpha alumina precursor or to a form that contains only a minor proportion of alpha alumina and has a degree of porosity, and then soaking the porous filamentary particles in a solution of salts of the modifiers to be incorporated, and then completing the firing to form alpha alumina in the fully densified form.

In its preferred mode, the process includes the addition to the initial sol or gel, of an effective amount of a submicron crystalline seed material that promotes the rapid conversion of the hydrated alumina in the gel to very fine alpha alumina crystals when the extruded and dried sol gel is fired. Examples of such seed material are gamma alumina, chromium oxide, alpha ferric oxide, alpha alumina, certain mixed oxides with the crystal structure of alpha alumina and precursors of all such oxides, as well as other fine debris that can act as nucleation sites for alpha alumina.

It is preferred that the microcrystalline structure be substantially free of gross amounts of impurities that, upon firing, would give rise to a separate glassy phase. By "glassy" material is meant amorphous non-crystalline material with no long-term molecular order. Significant amounts of such material significantly weakens the overall particle structure and renders it less effective as an abrasive grain. Thus the particles of the invention contain less than 5% and preferably less than 2% by weight of any such glassy component.

DETAILED DESCRIPTION OF THE INVENTION

For purposes of this application and the invention disclosed herein, the term "filament(s)" is used to refer to elongated ceramic bodies each having a generally consistent cross sectional shape along its length with a maximum cross-sectional dimension not exceeding about 1.5 mm, and more preferably, less than about 0.5 mm and wherein the length is at least as great as, and preferably at least about twice the maximum dimension of the cross section. This ratio is known as the "aspect ratio" and should therefore be at least 1 and more preferably from about 2:1 to about 20:1 and especially from about 2:1 to about 8:1. The abrasive filaments of the invention may be bent or twisted so that the length is measured along the body rather than necessarily in a straight line.

Abrasive filaments are preferably obtained, in general, by extruding or spinning a gel of the modified hydrated alumina into continuous filaments, drying the filaments so obtained, cutting or breaking the filaments to the desired lengths, and then firing the filaments to a temperature of not more than 1500° C. Other methods are available in which the filamentary particles are formed in precisely controlled lengths by controlled or metered extrusion or by a molding process.

Various sol gel methods of preparation and firing of gels of hydrated alumina are described in U.S. Pat. Nos. 4,314,827, 4,623,364, 4,797,139, 4,881,951, 5,034,360, 5,076,815, 5,106,791, 5,114,891, 5,141,527, 5,164,348, 5,190,567, 5,192,339, 5,194,073, 5,215,551, and 5,236,471 all of which patents are incorporated herein, in total, by reference.

In its most preferred embodiment, the sol or gel includes a dispersed submicron crystalline seed material or a precursor thereof in an amount effective to facilitate the conversion of the hydrated alumina particles to alpha alumina upon sintering. The amount of seed material should not exceed about 10% by weight of the hydrated alumina and there is normally no benefit to amounts in excess of about 5%. If the seed is adequately fine (preferably 60 $m^2$ per gram or more), amounts of from about 0.5 to 10% may be used with 1-5% being preferred. Addition of much more tends to affect the stability of the sol-gel and make filament formation difficult. In addition, there is a large reduction in the strength of the inter-crystalite bonds formed during sintering because pre-formed alpha alumina particles require much higher temperatures to achieve sintering. Of course, such higher temperatures lead to crystal growth and other negative consequences.

The filaments can have any convenient cross-section such as round, square, triangular or star-shaped. They can also be hollow, for example with an annular cross section. For most applications a round cross-section is preferred, but some applications may be better served by others, such as square or triangular.

The green abrasive filaments may be formed from the gel by a variety of methods, such as by extrusion or spinning. Extrusion is most useful for green filaments between about 0.25 and 1.5 mm in diameter which, after drying and firing, are roughly equivalent in diameter to that of the screen openings used for 100 grit to 24 grit abrasive grits, respectively. Spinning is most useful for fired filaments less than about 100 microns in diameter. Fired filaments as fine as 0.1 micron (0.0001 mm) may be made by spinning in accordance with the invention. The green filaments shrink upon firing. For example at 60% solids the filaments shrink about 40% in diameter from their extruded diameter.

Gels most suitable for extrusion should have a solids content of between about 10% to about 68% and preferably about 45% and 64%. The optimum solids content varies directly with the diameter of the filament being extruded, with about 60% solids content being preferred for filaments having a fired diameter roughly equivalent to the screen opening for a 50 grit crushed abrasive grit (about 0.28 mm). As indicated above, attempts to achieve too high a solids content in the gel by incorporating solid materials usually has a severe detrimental effect on the stability of the gel. The extrudate has little green strength as a rule and often will not hold a filamentary shape except at diameters above about 2 mm.

Various desired shapes may be imparted to extruded gel filaments by extruding the gel through dies having the shape desired for the cross section of the filament. If the gel filaments are relatively large in cross section or have been made from a gel containing a large amount of water, it may be necessary or preferable to dry them at a temperature below 100° C for 24-72 hours before subjecting them to any heating above 100° C. If the gel filaments have a relatively thin cross section or are made from very high solids gels, such a separate drying step may not be necessary.

It is, of course, anticipated that the filaments of the invention could be dried and fired as essentially continuous filaments that could be used as reinforcing elements in a matrix of, for example, a metal or plastic, where their toughness would be very advantageous.

The initially formed continuous filaments are preferably broken or cut into lengths of the maximum dimension desired for the intended grinding application. In general, any shaping or partitioning operation needed to convert the continuous filaments into discrete bodies or to change their shape is best accomplished at the gel stage, or the dried stage because it can be accomplished with much less effort and expense at these points than by attempting to operate on the much harder and stronger bodies formed after final firing according to this invention. Thus, as the continuous filaments emerge from the extruder die, may be reduced to the desired length filament by any suitable means known to the art, for example, by a rotating wire cutter mounted adjacent the face of the die. Alternatively, the dried filaments may be broken or lightly crushed and then classified to desired ranges of length.

After the gel filaments have been shaped as desired and cut and dried if needed, they are converted into final form filaments by controlled firing. The firing should be sufficient to convert substantially all the alumina content of the gel filaments into crystalline alpha alumina, but should not be excessive in either temperature or time, because excessive firing promotes undesirable crystallite growth which leads to a product that is a less effective abrasive in use. Generally, for the preferred seeded gels firing at a temperature of between 1200° C. to 1350° C. for between 1 hour and 5 minutes respectively is adequate, although other temperatures and times may be used. For filaments coarser than about 0.25 mm, it is preferred to prefire the dried material at about 400°-600° C. from about several hours to about 10 minutes respectively, in order to remove the remaining volatiles and bound water which might cause cracking of the filaments during firing. The firing of unseeded gels generally requires higher temperatures and longer times as disclosed in U.S. Pat. No. 4,314,827. Particularly for filaments formed from seeded gels, excessive firing quickly causes larger grains to absorb most or all of smaller grains around them, thereby decreasing the uniformity of the product on a micro-structural scale.

The filaments most useful in the practice of the invention have a hardness of at least 14 GPa and preferably at least 18 GPa for most applications (Vickers indenter, 500 gm load), and are preferably at least 90% and usually most preferably at least 95% of theoretical density. Pure dense alpha alumina has a hardness of about 20-21 GPa. In some instances, at least, the abrasive filaments used in the practice of the invention may have a twist or curl in their lengthwise dimension, even to the extent of assuming a helical configuration, or be only somewhat curved or bent.

It is believed that curved or twisted abrasive filaments may be superior to their straight counterparts in bonded abrasive applications because the curved or twisted configuration would make the abrasive filaments so shaped more difficult to pull out of its bond. In addition, such curled or twisted abrasive filaments make it easier to obtain desired ranges of loose packed density in a grinding wheel. The diameter of the abrasive filaments can be as high as about 1.5 mm. The abrasive filaments of the present invention have been found to produce bonded abrasive products that are far superior to the same products containing crushed fused and sintered abrasive grain which have a cross section (grit size) about equal to the diameter of the abrasive filament.

As an alternative to the above extrusion technique the abrasive filamentary particles may be formed by a molding process in which the gel is forced in to a suitably shaped mold and dried and fired in such a fashion that the particle retains the general shape of the mold.

The abrasive filamentary particles of the invention may be used in bonded abrasive products, such as grinding wheels, segments, and sharpening stones, which are comprised of a bond and sintered sol gel abrasive filaments. The amounts of bond and abrasive may vary, on a volume percent basis, from 3% to 76% bond, 24% to 62% abrasive, and 0% to 73% pores. As can be seen from these volume percent compositions, the filament shaped abrasive allows the production of bonded abrasive products with significantly higher structure numbers in softer grades than were heretofore possible with conventionally shaped equiaxed abrasive. However, conventional pore inducing media such as hollow glass beads, solid glass beads, hollow resin beads, solid resin beads, foamed glass particles, bubble alumina, and the like, may be incorporated in the wheels thereby providing even more latitude with respect to grade and structure number variations.

The abrasive products may be bonded with either a organic, vitrified or metallic bond. The preferred resinoid bonds are based on phenol-formaldehyde resin, epoxy resin, polyurethane, polyester, shellac, polyimide, phenoxy, polybenzimidazole or mixtures thereof. The bonds may include from 0% to 75% by volume of any one or several fillers or grinding aids as is well known ill the art. When the bond is of the resinoid type, suitable fillers include cryolite, iron sulfide, calcium fluoride, zinc fluoride, ammonium chloride, copolymers of vinyl chloride and vinylidene chloride, polytetrafluoroethylene, potassium fluoroborate, potassium sulfate, zinc chloride, kyanite, mullite, nepheline syenite, molybdenum disulfide, graphite, sodium chloride, or mixtures of these various materials.

Vitrified bonds, while amenable to the incorporation of fillers therein, somewhat limit the number of fillers which are useful because of the relatively high temperatures which are required to mature such bonds. However, fillers such as kyanite, mullite, nepheline syenite, graphite, and molybdenum disulfide may be used depending on the maturing temperature of a particular vitrified bond. Vitrified bonded wheels may also be impregnated with a grinding aid such as molten sulfur or may be impregnated with a vehicle, such as epoxy resin, to carry a grinding aid into the pores of the wheel.

In making coated abrasive products using the abrasive filaments of the invention, the abrasive filaments are attached to a flexible backing proximate one end of the filament by an adhesive maker coat. The filaments extend generally away from the backing and are normally over-coated with size coat to further anchor them into the backing. The backing may be formed of any of the known backing used for coated abrasives, such as, for example, woven or stitch bonded fabrics, film or paper. A variety of well known cloth or paper finishing methods and materials are used in the industry to prepare the backing, depending on the application, and are equally applicable to the coated abrasive backings used in the present invention. Similarly any of the well known standard maker coats used in coated abrasive manufacture may be used.

If the average aspect ratio of the abrasive filaments of the invention can be, e.g. 1.5:1 to 6:1 or even higher, the size coat may be applied by standard roll coating techniques. If the abrasive filaments have a longer aspect ratio it is preferred to coat by other means, such as spray coating, which will not squash down the filaments excessively. The materials used for the size coating may also be of any of the known types used in the coated abrasive industry.

It has been found that the coated abrasives of the present invention have substantially longer lives than those incorporating the crushed grits of the prior art. They also tend to cut at a less variable rate and impart a less variable surface finish to the work piece over their useful lives than do prior art coated abrasives.

Unexpectedly, it has also been found that the use of coated abrasives incorporating the abrasive filaments of the present invention are particularly effective in low pressure grinding operations.

A unique advantage of the invention is that not only can coated abrasive products be provided having various length abrasive filaments as desired, but the size distribution for a particular application can be as exact or varied as desired, something not heretofore obtainable with roll crushed abrasive grain.

A further advantage is that in coated abrasive products incorporating the abrasive filaments of the invention, the filaments may be cut to a variety of lengths or aspect ratios, to simulate a standard CAMI graded filament blend. Alternatively, the coated abrasives can have a designed blend of over grade, control and fine diameter abrasive filaments.

Another advantage in the use of abrasive filaments is that there is no waste such as occurs with conventional crushed grits so that the manufacturing operations are more economical and efficient.

The abrasive filaments of the invention and the bonded and coated products containing said abrasive are, in general, superior to prior art abrasives as the following examples show. The abrasive products are suitable for grinding all types of metal such as various steels like stainless steel, cast steel, hardened tool steel, cast irons, for example ductile iron, malleable iron, spheroidal graphite iron, chilled iron and modular iron, as well as metals like chromium, titanium, and aluminum. As is the case with all abrasives and the bonded or coated products containing them, the abrasive and bonded products of the invention will be more effective grinding some metals than others and will be more efficient in some grinding applications than in others.

EXAMPLES OF THE PREFERRED EMBODIMENTS

Example I

The purpose of this example is to show the advantage that flows from the use of the filamentary shape over the more conventional crushed random shapes of the prior art. Two batches, (referred to as "A" and "B"), of gel were made with closely similar compositions.

These two gels were dried and then regelled and formed into both filamentary or random shaped particles. The filamentary particles had a greatest cross-sectional dimension corresponding to a 120 grit abrasive particle by the FEPA standard for coated abrasives. The random shaped particles were screened to a FEPA grit size of 80.

Batch A Preparation 134 kg of water were mixed with 16.5 kg of 20% concentration nitric acid and 89 kg of Pural boehmite from Condea GmbH in a 100 gallon Ross Power mixer for 10 minutes. Then the following were added while the mix was under vacuum: 1.63 kg of yttrium nitrate hexahydrate and 1.4 kg of neodymium nitrate hexahydrate in 12 kg of water; 1.4 kg of lanthanum nitrate hexahydrate in 6 kg of water; and 7 kg of magnesium nitrate hexahydrate in 18.2 kg of water.

The mixture, which had a solids content of 35%, was given a further 15 minutes of mixing before being spread into 10 cm deep pans to a depth of about 7.5 cm and then dried at 60° C.

Batch B Preparation

The initial batch was exactly the same as in Batch A except that the mixer contained 194 kg of water. The same salts were added in the same way but in the following amounts: yttrium nitrate, (3.1 kg) and lanthanum nitrate, (2.7 kg) in 13.7 kg of water; magnesium nitrate, (6.4 kg), in 9 kg of water; and neodymium nitrate, (2.6 kg), in 9 kg of water.

This mixture was mixed for a further 20 minutes before being unloaded into the same type of pans and dried at 50° C.

The two batches, upon analysis had the added components, (measured as the oxides), present in the following proportions:

|   | Mgo   | $Y_2O_3$ | $La_2O_3$ | $Nd_2O_3$ |
|---|-------|-------|-------|-------|
| A | 1.65% | 0.8%  | 0.8%  | 0.8%  |
| B | 1.40% | 1.35% | 1.31% | 1.27% |

To make the filamentary particles the dried gel was then re-gelled to a solids content of about 54%. This high solids gel was then conventionally extruded through a smooth walled die with multiple holes about 1.19 mm in diameter to produce continuous gel filaments. The gel filaments were dried for 24–72 hours at a temperature of 75° to 80° C. and a relative humidity of >85%. After this drying step, the filaments were relatively brittle and could easily be broken into short lengths. For this example, the filaments were converted into filamentary particles with an average length of 2 mm to 8 mm. These short filaments were then converted to alpha alumina by heating at a rate of <2° C. per minute to 800° C., at a rate of about 5° C. per minute from 800° C. to 1370° C., held at the latter temperature for 5 minutes, and then allowed to cool. After cooling, the filaments had an average diameter corresponding to a grit size of 120 and random lengths from about 1.5 mm to 6 mm.

These filamentary grits were made by conventional means into coated abrasive discs. The discs were made on a 30 mil fiber backing and employed a conventional calcium carbonate filled phenolic resole resin maker coat and a cryolite filled phenolic resole size coat.

To make the conventional grits the dried gel was crushed and graded and then fired to convert to alpha alumina before being regraded to separate an 80 grit material. Comparison discs were made from these crushed grits using the same materials. The object of this was to ensure that the only difference between the filamentary grits and the crushed grits lay in the configuration of the grain and in the grit size. The filamentary grains had diameters corresponding to a grit size that was rather smaller than that of the crushed grain. This was done in spite of the conventional experience that bigger grains remove more material than smaller grains under comparable conditions, though perhaps leaving an inferior finish. The comparison was made in this way to ensure that any difference could not be attributed to the greater mass/grain of the filamentary particles, (usually irrelevant since only a small amount of the grain contacts the workpiece during grinding), and to ensure that the test did not favor the filamentary grain in any way.

TABLE I

| SAMPLE | TEST #1 | TEST #2 | TEST #3 | AVERAGE |
|---|---|---|---|---|
| A-Crushed (80) | 145 gm. | 134 gm. | 153 gm. | 100% |
| B-Crushed (80) | 167 gm. | 153 gm. | 158 gm. | 110% |
| A-Filam. (120) | 191 gm. | 202 gm. | — | 140% |
| B-Filam. (120) | 184 gm. | 208 gm. | 183 gm. | 130% |

In the above evaluations the first sample, (of the "A" run, 80 grit crushed grain sample), was taken arbitrarily as representing 100% and the rest were compared against that standard.

The test was performed in each case on 1020 HR steel piece which is abraded by the disc in a back and forth motion for two minutes under a set weight of 7 pounds applied force. The test piece was reciprocated at a speed of 7 surface feet per minute.

From the above data it is clear that the filamentary product performed much better than the crushed grain even though it had a finer grit size. This makes the performance improvement really quite surprising and clearly a function of the shape of the grit rather than the composition which was unchanged between the crushed and filamentary exemplars and little changed between the two gel production runs.

That the grits were, (in terms of their physical properties—as shown in Table 2 below), virtually identical, makes this finding very remarkable indeed.

TABLE 2

| PROPERTY (average of A&B) | CRUSHED | FILAMENT |
|---|---|---|
| Density (water) | 3.85 gm/cc | 3.85 gm/cc |
| Density (helium) | 3.87 gm/cc | 3.86 gm/cc |
| Loose Pack Density | 1.78 | 1.795 |
| Hardness (GPa) | 20.33 | 16.93 |
| Alumina crystal size | 1.735 micron | 1.4 micron |
| Aspect Ratio | — | 4.02 |

What is claimed is:

1. Sol-gel alumina abrasive filamentary articles having a generally consistent cross-sectional shape along their length, maximum cross-sectional dimension of 1.5 mm or less and an aspect ratio of at least 1, said particles comprising from about 0.5 to about 10% by weight of yttria and from about 0.2 to about 5% by weight of a rare earth metal oxide selected from the group consisting of praseodymia, samaria, ytterbia, neodymia, lanthana, gadolinia, dysprosia, erbia and mixtures of two or more such oxides, all percentages being based on 100% of alpha alumina.

2. Filamentary abrasive particles according to claim 1 in which the rare earth metal oxide is present as a reaction product with alumina.

3. Filamentary abrasive particles according to claim 1 in which the amount of yttria present is less than 5% by weight based on the alumina weight.

4. Filamentary abrasive particles according to claim 1 in which the rare earth metal oxides are selected from lanthana, neodymia and praseodymia.

5. Filamentary abrasive particles having a generally consistent cross-sectional shape along their length, a maximum cross-sectional dimension of 1.5 mm or less and an aspect ratio of at least 1, said particles comprising a sol-gel alumina and, based on the weight of alumina, from about 0.5 to about 5% by weight of yttria and from about 0.5 to about 4% by weight of a combination of neodymia and lanthana, each as reaction products with alumina dispersed in a matrix of alumina.

6. Filamentary abrasive particles according to claim 1 having a matrix phase of sub-micron sized alpha alumina crystals.

7. Filamentary abrasive particles according to claim 5 having a matrix phase of sub-micron sized alpha alumina crystals.

* * * * *

UNITED STATES PATENT AND TRADEMARK OFFICE
CERTIFICATE OF CORRECTION

PATENT NO. : 5,372,620
DATED : December 13, 1994
INVENTOR(S) : Robert A. Rowse, et. al.

It is certified that error appears in the above-indentified patent and that said Letters Patent is hereby corrected as shown below:

Claim 1, Column 9, line 29

Delete "articles" and insert---particles---

Claim 1, Column 9, line 31
After "length," insert ---a---

Signed and Sealed this

Thirtieth Day of May, 1995

Attest:

BRUCE LEHMAN

Attesting Officer    Commissioner of Patents and Trademarks